US012724866B2

(12) United States Patent
Chen et al.

(10) Patent No.: US 12,724,866 B2
(45) Date of Patent: Sep. 1, 2026

(54) ACTIONS BASED ON LOCATIONS IN ENVIRONMENTS

(71) Applicant: HEWLETT-PACKARD DEVELOPMENT COMPANY, L.P., Spring, TX (US)

(72) Inventors: Jhih-Jie Chen, Taipei City (TW); Chih-Hsin Lee, Taipei City (TW); Kun-Jung Wu, Taipei City (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 1083 days.

(21) Appl. No.: 17/866,302

(22) Filed: Jul. 15, 2022

(65) Prior Publication Data

US 2024/0020374 A1 Jan. 18, 2024

(51) Int. Cl.

*G06F 21/35* (2013.01)
*G01S 17/89* (2020.01)
*H04W 64/00* (2009.01)

(52) U.S. Cl.

CPC .............. *G06F 21/35* (2013.01); *G01S 17/89* (2013.01); *H04W 64/00* (2013.01)

(58) Field of Classification Search

CPC ................................ G06F 21/35; G01S 17/89
See application file for complete search history.

(56) References Cited

U.S. PATENT DOCUMENTS

| | | | | |
|---|---|---|---|---|
| 8,484,494 | B2 * | 7/2013 | Siegel | G06F 1/3203 340/686.6 |
| 11,990,012 | B2 * | 5/2024 | Russell | H04W 4/027 |
| 12,014,120 | B2 * | 6/2024 | Li | G06V 10/44 |
| 12,333,759 | B2 * | 6/2025 | Wu | G06V 20/20 |
| 2017/0053210 | A1 * | 2/2017 | Duong | G06N 20/00 |
| 2023/0209355 | A1 * | 6/2023 | Nam | G01S 7/006 455/456.1 |

* cited by examiner

*Primary Examiner* — Christian Chace
*Assistant Examiner* — Minato Lee Horner
(74) *Attorney, Agent, or Firm* — Quarles & Brady LLP

(57) ABSTRACT

In some examples, an electronic device comprises a camera to capture data representing an environment external to the electronic device; a sensor to determine a location of a second electronic device in the environment; and a controller coupled to the camera and the sensor. The controller is to generate a representation of the environment based on the captured data; determine a relationship between the location and the representation; and perform an action based on the relationship.

19 Claims, 8 Drawing Sheets

ACTIONS BASED ON LOCATIONS IN ENVIRONMENTS

BACKGROUND

Some electronic devices, such as notebooks, laptops, digital cameras, smartphones, and desktop computers, may contain confidential information that is to be protected from unauthorized users. For example, a user may lock or log out of her account whenever she walks away from her computer, and when she returns to her computer, she may enter her credentials to unlock or log back in to the computer.

BRIEF DESCRIPTION OF THE DRAWINGS

Various examples will be described below referring to the following figures.

DETAILED DESCRIPTION

Figure 1A:
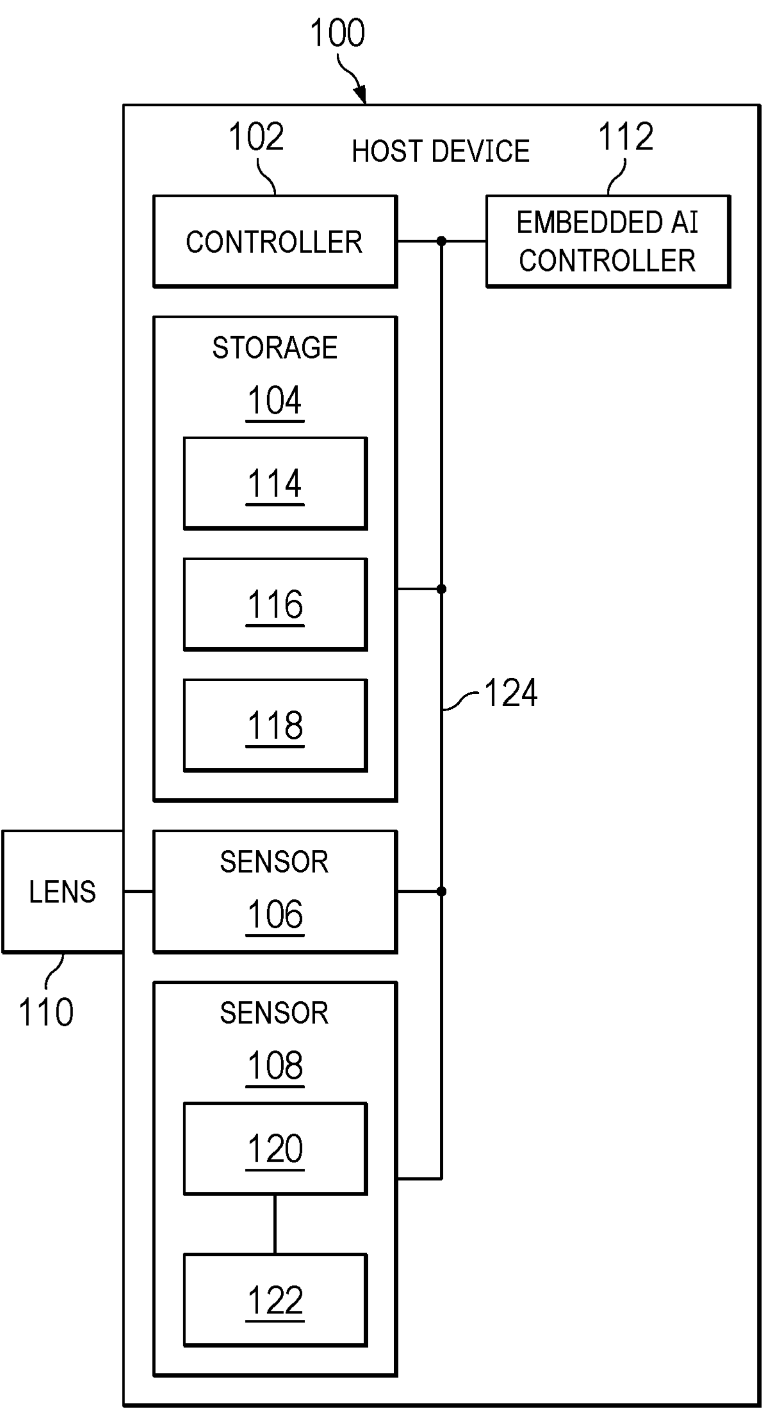
FIGS. 1A-1C are block diagrams of a host device in accordance with various examples.

As described above, in some electronic devices, such as notebooks, laptops, digital cameras, smartphones, and desktop computers, may contain confidential information that is to be protected from unauthorized users. For example, a user may lock or log out of her account whenever she walks away from her computer, and when she returns to her computer, she may enter her credentials to unlock or log back in to the computer. In some cases, the user may be absent from her computer for an extended time, and in other cases, she may be absent for a short time, but the computer may fail to conserve power at appropriate times or may enter a power conservation mode at inappropriate times. These events are time-consuming, tedious, and power-inefficient.

This disclosure describes various examples of an electronic device that mitigates the challenges described above by tracking the movement of a user in an environment and taking predetermined actions based on the location(s) of the user in the environment. For example, the electronic device may determine that the user has moved from the electronic device to the restroom (toilet or washroom), in which case the electronic device may lock itself and enter a power conservation mode. In another example, the electronic device may determine that the user has moved to a boardroom, in which case the electronic device may transfer a video conference session from the electronic device to another electronic device located in the boardroom. In yet another example, the electronic device may determine that the user has gone to the on-campus gym, in which case the electronic device may lock itself and stream music to another electronic device with the user, such as a pair of earbuds. In still another example, the electronic device may determine that the user has left the premises, in which case the electronic device may shut itself down or enter a deep power conservation mode (e.g., a hibernation mode).

In some examples, the electronic device includes a light detection and ranging (LiDAR) camera useful to capture optical data representing the environment. The electronic device also includes an ultra-wide band (UWB) sensor useful to communicate with a second electronic device that the user carries with her, such as a smartphone in a purse or pocket. The UWB sensor is useful to determine a location of the second electronic device relative to the electronic device. The electronic device may include a controller that is to generate a representation of the environment based on the captured optical data, determine a relationship between the representation and the user's location, and perform an action based on the relationship. For example, the electronic device may use the LiDAR sensor to capture optical data representing an office environment, use the UWB sensor to determine the user's location in the office environment, develop a floorplan of the office environment based on the captured optical data, use the user's location to determine where the user is in the floorplan (e.g., in a restroom, boardroom, breakroom, etc.), and perform actions based on the determination (e.g., lock itself and enter a power conservation mode while the user is in the restroom and unlock itself and exit the power conservation mode as the user approaches the electronic device after using the restroom). In this way, power is appropriately conserved and confidential information is protected without the challenges described above.

FIG. 1A is a block diagram of a host device 100 in accordance with various examples. The host device 100 may be any suitable electronic device, such as a laptop computer, a desktop computer, a notebook, a tablet, or a server. The host device 100 may be any type of electronic device having a display that is to display information of a confidential, private, or sensitive nature. The host device 100 may be any type of electronic device that is battery-operated. The scope of this disclosure is not limited to these particular types of electronic devices.

The example host device 100 includes a controller 102 (e.g., a central processing unit, a microcontroller). The controller 102 may be coupled to, and may be to control, a storage 104 (e.g., random access memory (RAM), read-only memory (ROM)), a sensor 106 (e.g., a Light Detection and Ranging (LiDAR) camera module), and a sensor 108 (e.g., an ultra-wide band (UWB) sensor module). The sensor 106 may be coupled to a lens 110 that is to capture images and/or video of an environment of the host device 100. The host device 100 may further include an embedded artificial intelligence (AI) controller 112 that is coupled to the controller 102. In examples, the storage 104 stores executable code 114 (e.g., an operating system (OS)), executable code 116 (e.g., firmware), and executable code 118 (e.g., one or more applications). The controller 102 is to execute the executable code 114, 116, and/or 118, thereby causing the controller 102 to perform one or more actions, including the actions attributed herein to the controller 102 and/or to the host device 100. The sensor 108 may include a transceiver 120 and an antenna 122 coupled to the transceiver 120. A bus 124 may couple the various components of the host device 100 to each other, as shown.

In examples, the controller 102 may use the sensor 106, which may be a LiDAR camera module, and the lens 110 to capture images of an environment of the host device 100. For example, the sensor 106 may emit a laser useful in scanning and capturing images of the environment. The sensor 106 and/or the controller 102 determines an amount of time elapsed between emission of a laser from the sensor 106 and receipt of the laser (e.g., after being reflected off of objects in the environment, such as walls, doors, floors, ceilings, furniture, etc.) by the lens 110. The elapsed time represents a distance between the sensor 106 and the object (s) off of which the laser reflected. By iteratively performing such laser emissions, receptions, and calculations, the controller 102 is to generate a three-dimensional floorplan of the environment of the host device 100.

The controller 102 may further refine the three-dimensional floorplan by identifying specific structures in the floorplan using the embedded AI controller 112. The embedded AI controller 112 is to be trained using one or more suitable training data sets to receive image data captured by a LiDAR camera module (e.g., sensor 106) and to identify specific structures using the image data. Thus, for instance, the floorplan generated by the controller 102 may specify that particular areas of the floorplan are restrooms (e.g., toilets), meeting rooms, supply rooms, kitchens, etc. Similarly, the floorplan may identify specific types of furniture or structures, such as desks, refrigerators, copiers, conference room tables, chairs, sofas, lamps, toilet commodes, sinks, microwaves, exit signs, etc. An example three-dimensional floorplan of the environment is provided in FIG. 3 and is described below.

Figure 2:
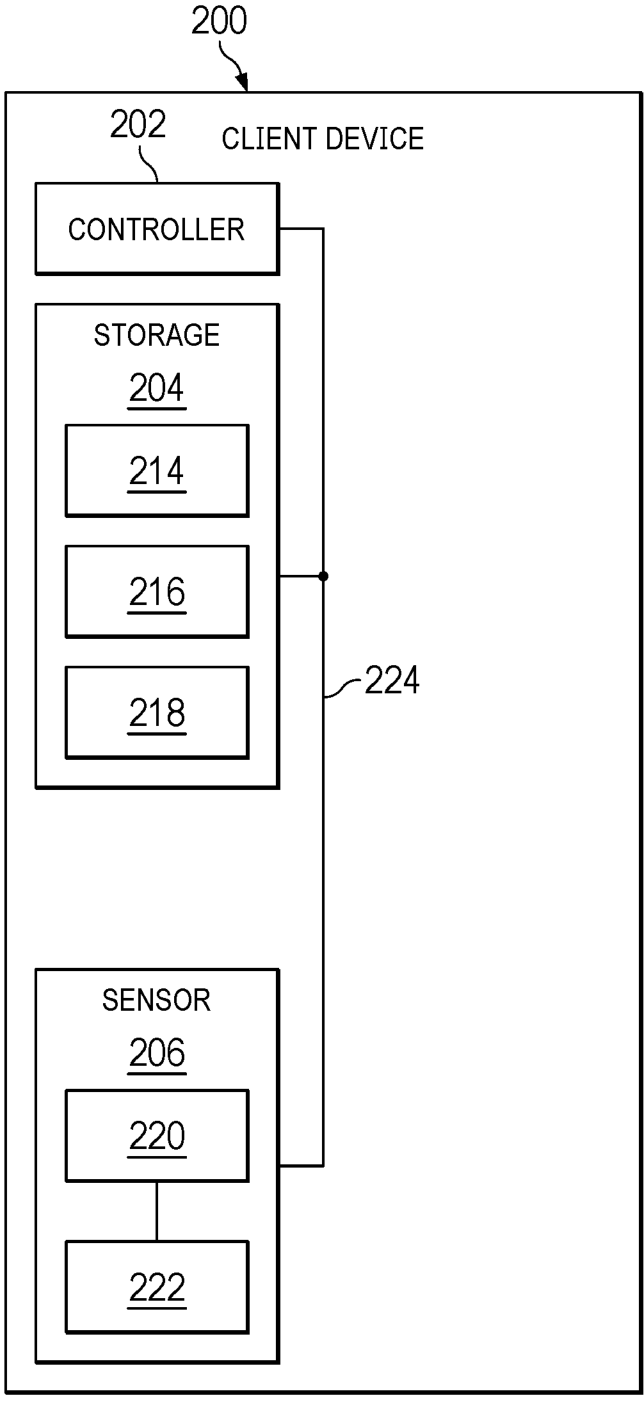
FIG. 2 is a block diagram of a client device in accordance with various examples.

In examples, the controller 102 may use the sensor 108, which may be a UWB sensor module, to determine a location of another electronic device, such as a smartphone carried by a user of the host device 100 as the user is away from the host device 100 and is moving about the environment. (Such an electronic device is depicted in FIG. 2 and is described below.) For example, both the host device 100 and the electronic device carried by the user may include UWB sensor modules that are useful to perform ranging operations (e.g., using Time of Flight (ToF) techniques) to determine their relative locations. Thus, for instance, the controller 102 may use the sensor 108 to identify a location of the electronic device (e.g., smartphone) carried by the user as the user moves about the environment. Similarly, the electronic device (e.g., smartphone) carried by the user may determine a location of the host device 100. In examples, the controller 102 may use the sensors 106, 108 and the embedded AI controller 112 to identify a location of the user carrying the electronic device (e.g., smartphone) in the context of the three-dimensional floorplan described above. Thus, for example, the controller 102 may determine that the electronic device of the user is located in the area of the floorplan identified as the restroom, or in an area of the floorplan identified as the kitchen, etc. As described below, the controller 102 may perform one or more specific, predetermined actions based on the location of the electronic device of the user within the context of the three-dimensional floorplan.

Figure 1B:
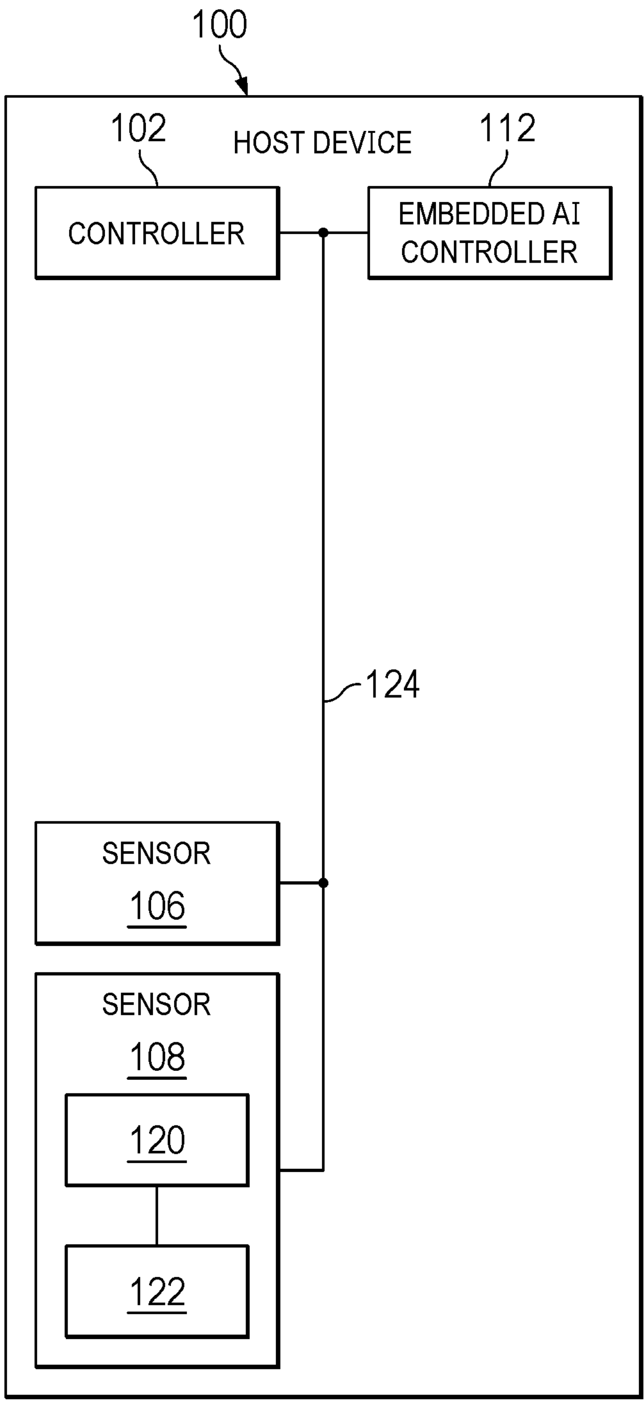
Figure 1C:
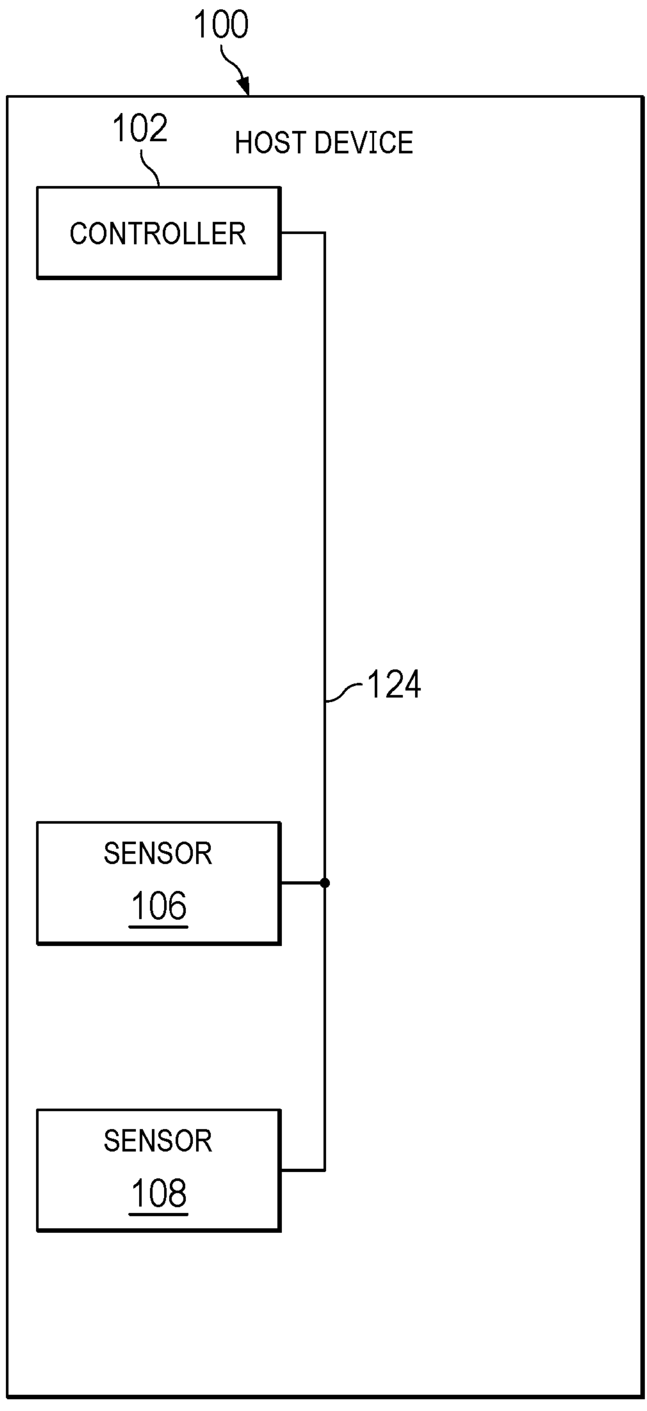

FIGS. 1B and 1C provide examples of the host device 100. The examples of FIGS. 1B and 1C may operate in a manner similar to that described herein for the host device 100 of FIG. 1A.

FIG. 2 is a block diagram of a client device 200 in accordance with various examples. In examples, the client device 200 is an electronic device carried by the user of the host device 100 as the user is away from the host device 100 and is moving about the environment or is in a different area of the environment than the host device 100. For example, the client device 200 is a smartphone, personal digital assistant, a laptop computer, a notebook, or a tablet. In examples, the client device 200 includes a pair of earbuds or headphones, or the client device 200 may include an augmented reality (AR) device such as AR glasses. The client device 200 may be carried in or on the user's pockets, purse, hands, ears, eyes, or head, for example. The client device 200 may include a controller 202, a storage 204, and a sensor 206 (e.g., a UWB sensor) coupled to each other by way of a bus 224. The storage 204 may include executable code 214 (e.g., an OS), executable code 216 (e.g., firmware), and executable code 218 (e.g., one or more applications). Execution of one or more of the executable code 214, 216, and/or 218 may cause the controller 202 to perform the actions attributed herein to the controller 202 and/or the client device 200. In examples, the sensor 206 includes a transceiver 220 coupled to an antenna 222. The sensor 206 (e.g., the transceiver 220 and antenna 222) may communicate with the sensor 108 (e.g., the transceiver 120 and antenna 122) of host device 100 to perform ranging operations as described herein. Example operations of the client device 200 vis-à-vis the host device 100 are described below.

Figure 3:
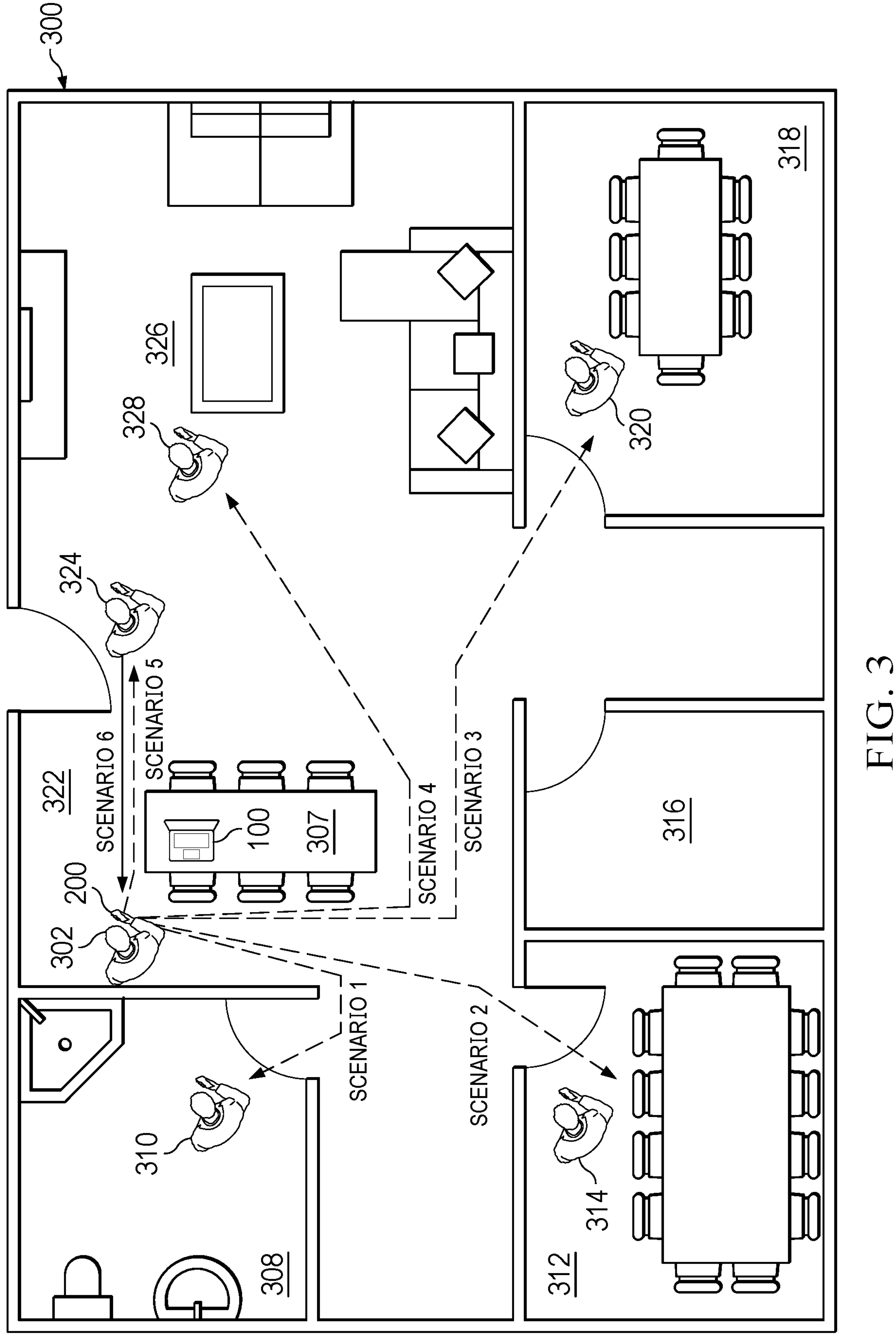
FIG. 3 is a floorplan of an environment in accordance with various examples.

FIG. 3 is a floorplan 300 of an environment in accordance with various examples. Although the floorplan 300 is shown as two-dimensional, in examples, the floorplan 300 is three-dimensional. In examples, the floorplan 300 is four-dimensional, meaning the floorplan 300 accounts for regular changes that occur in the environment over time. For instance, the floorplan 300 may account for a desk that is regularly moved from a first location in the environment to a second location in the environment at 4 PM every day and is repositioned in the first location at 9 AM every day. The floorplan 300 may account for such temporal changes by including multiple three-dimensional floorplans indexed by time, for example.

The example floorplan 300 includes the host device 100, a desk 307 supporting the host device 100, a restroom 308 (e.g., having a toilet commode, a sink/wash area, and a shower), a meeting room 312 (e.g., having a conference table with chairs), a pantry 316, a kitchen 318 (e.g., having a dining table with chairs), a work area 322 (e.g., having multiple desks with chairs), and a public space 326 (e.g., having sofas, a coffee table, and an entertainment center). Numerals 302, 310, 314, 320, 324, and 328 show example locations of the user (and, more particularly, of the client device 200 carried by the user) within the environment of the host device 100. Although not part of the floorplan 300, FIG. 3 shows example Scenarios 1-6 to assist in describing operation of the host device 100 and client device 200. In Scenario 1, the user, who is normally seated at the desk 307 in front of the host device 100, moves to the restroom 308 while carrying the client device 200. In Scenario 2, the user, who is normally seated at the desk 307 in front of the host device 100, moves to the meeting room 312 while carrying the client device 200. In Scenario 3, the user, who is normally seated at the desk 307 in front of the host device 100, moves to the kitchen 318 while carrying the client device 200. In Scenario 4, the user, who is normally seated at the desk 307 in front of the host device 100, moves to the public space 326 while carrying the client device 200. In Scenario 5, the user, who is normally seated at the desk 307 in front of the host device 100, moves to exit the environment through a door while carrying the client device 200. In Scenario 6, the user, who has been away from the host device 100, moves toward the host device 100 (e.g., returning to the desk 307 after taking a restroom or snack break).

After the floorplan 300 has been formed, the controller 102 uses the sensor 108 (e.g., UWB sensor) to determine the location of the client device 200 within the workspace. For instance, if the controller 102 determines the client device 200 is in the restroom 308 as Scenario 1 indicates, the controller 102 may perform a specific, predetermined action (e.g., may log the user out of host device 100 or may lock an account of the host device 100). If the controller 102 determines the client device 200 is following Scenario 2, the controller 102 may perform a specific, predetermined action (e.g., may determine the user is participating in a videoconference call and may launch the call in the meeting room 312 while locking the host device 100, or may hand off an existing videoconference call from the host device 100 to equipment in the meeting room 312) or to the client device 200. If the controller 102 determines the client device 200 is following Scenario 3, the controller 102 may enter standby mode. If the controller 102 determines the client device 200 is following Scenario 4, the controller 102 may stream music directly to the user's client device 200 or to earbuds the user is wearing (e.g., using BLUETOOTH®). If the controller 102 determines the client device 200 is following Scenario 5, the controller 102 may cause the host device 100 to hibernate or may shut down the host device 100, thereby preserving battery life. If the controller 102 determines the client device 200 is following Scenario 6, the controller 102 may wake the host device 100 and unlock the host device 100 or log into an account on the host device 100. Each location and a corresponding, predetermined action to be taken by the controller 102 may be programmed into the storage 104 (e.g., in a data structure). The controller 102 may adaptively learn the user's behaviors over time and adjust its behaviors accordingly. For example, in response to determining that the user takes long lunch breaks, the controller 102 may cause the host device 100 to enter hibernate mode instead of locking the screen, thereby preserving battery life. Any and all variations of these scenarios and responses to these scenarios are included in the scope of this disclosure.

Referring now to FIGS. 1A-3, in operation, upon execution of one or more of the executable code 114, 116, and/or 118, the controller 102 uses the sensor 106 to generate a three-dimensional floorplan (e.g., a three-dimensional version of the floorplan 300) of the environment of the host device 100. In some examples, the user of the host device 100 may walk through the environment of the host device 100 while carrying the host device 100, thereby providing the host device 100 an opportunity to capture some or all areas of the environment of the host device 100. In some examples, the user of the host device 100 may walk through the environment of the host device 100 while carrying the host device 100 periodically (e.g., once per week, once per month, once per year) to account for any changes to the environment that may have occurred due to construction, new furniture purchases, remodeling, etc. The controller 102 may use the embedded AI controller 112 to identify the various structures in the three-dimensional floorplan, such as specific types of rooms, furniture, etc. The user of the host device 100 may have an opportunity to correct, revise, or otherwise modify such identifications, in case the embedded AI controller 112 incorrectly or imprecisely identifies certain structures or locations in the environment. After the floorplan 300 has been formed, the controller 102 may use the sensor 108 to track the movement (e.g., monitor a location) of the user of the host device 100 within the environment of the host device 100. Responsive to the location of the user within the environment (e.g., Scenarios 1-6), the controller 102 performs one or more predetermined actions, such as those described above. In this way, the user does not have to concern herself with logging into or out of the host device 100, nor does the user have to concern herself with whether the host device 100 is appropriately engaging in energy preservation techniques. Rather, the controller 102 controls the host device 100 (as well as other devices in the environment via, e.g., a network connection) based on the user's movements in the environment.

Figure 4:
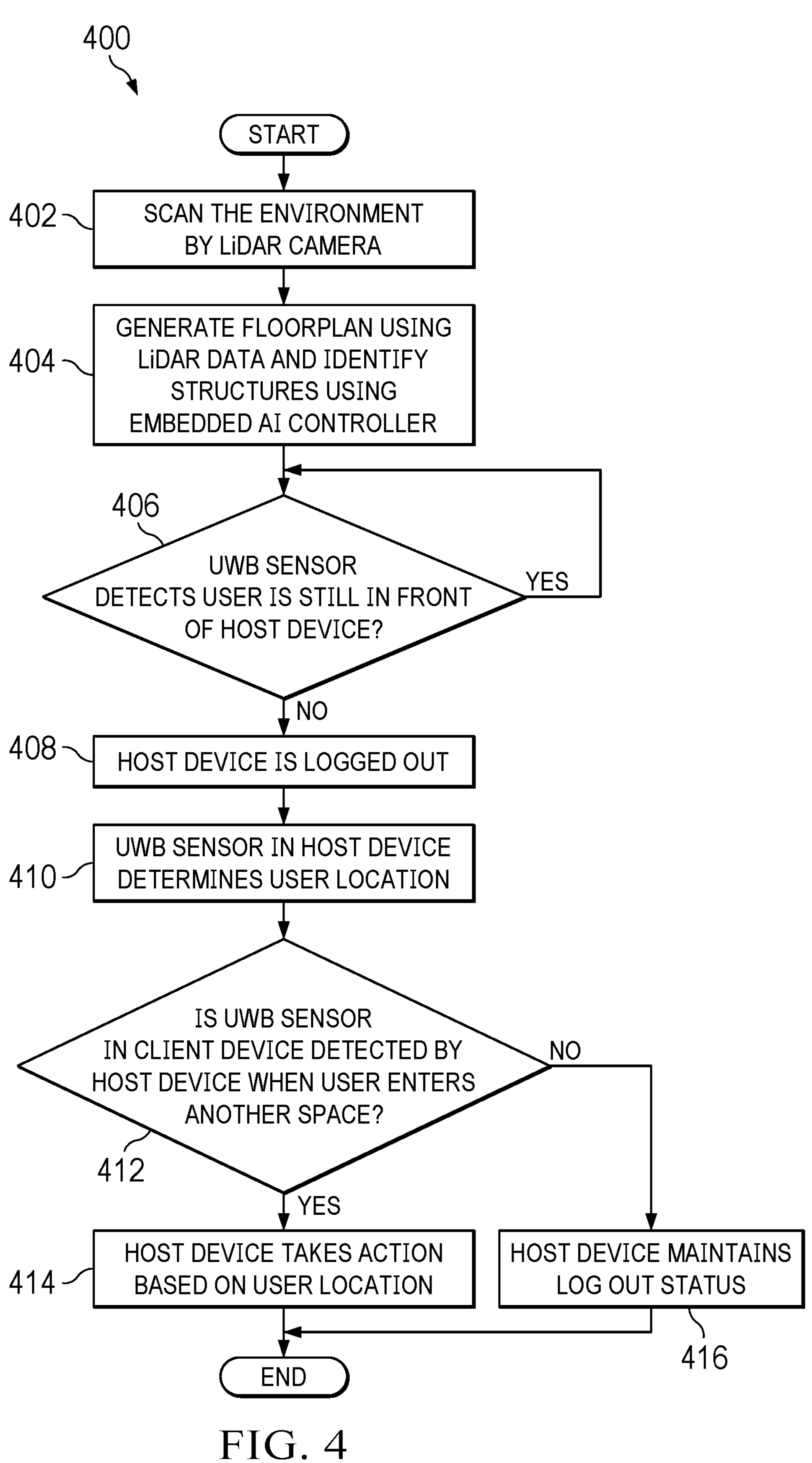
FIGS. 4 and 5 are flow diagrams of methods in accordance with various examples.
Figure 5:
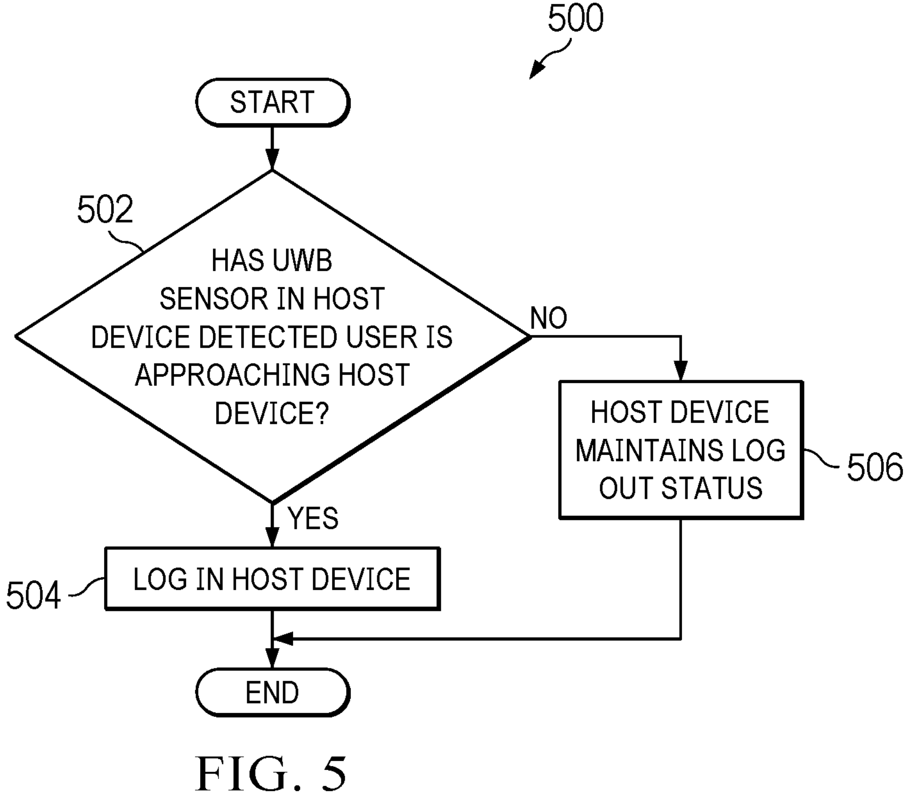

FIGS. 4 and 5 are flow diagrams of methods 400 and 500 in accordance with various examples. In examples, the controller 102 performs the methods 400 and 500. The method 400 includes scanning the environment of the host device 100 using the sensor 106 (e.g., a LiDAR camera module) (402). The method 400 includes generating a floorplan of the environment using the data captured by the sensor 106 and identifying structures in the floorplan using the embedded AI controller 112 (404) as described above. The method 400 includes the sensor 108 detecting whether the user is in front of the host device 100, e.g., by determining whether the client device 200 is within a predetermined distance (e.g., 2 feet) of the host device 100 (406). If so, control of the method 400 returns to step 406. Otherwise, the method 400 includes logging the user out of the host device 100 (408). The method 400 includes the host device 100 determining a location of the user within the environment (410), and, more particularly, a location of the client device 200. The method 400 includes determining whether the host device 100 has detected the user (e.g., the client device 200 carried by the user) entering another space within the environment, such as a break room, a kitchen, a meeting room, a restroom, etc. (412). If not, the host device 100 keeps the user logged out of the host device 100 (416). Otherwise, the host device 100 performs one or more predetermined actions based on the location of the client device 200 within the environment (414), for example, as described above.

The method 500 of FIG. 5 includes the host device 100 determining that the client device 200 is approaching the host device 100 (502). For example, the sensor 108 (e.g., UWB sensor) in the host device 100 may repeatedly determine a distance between the host device 100 and the client device 200, and if this distance is continually decreasing over a predetermined length of time, the host device 100 may conclude that the client device 200 is approaching the host device 100 (e.g., the user is walking toward the host device 100). In response, the host device 100 may log the user into an account of the host device 100 (504). Alternatively or in addition, the host device 100 may exit a power-conservation mode. Otherwise, the host device 100 may keep the user logged out of the host device 100 (506).

Figure 6:
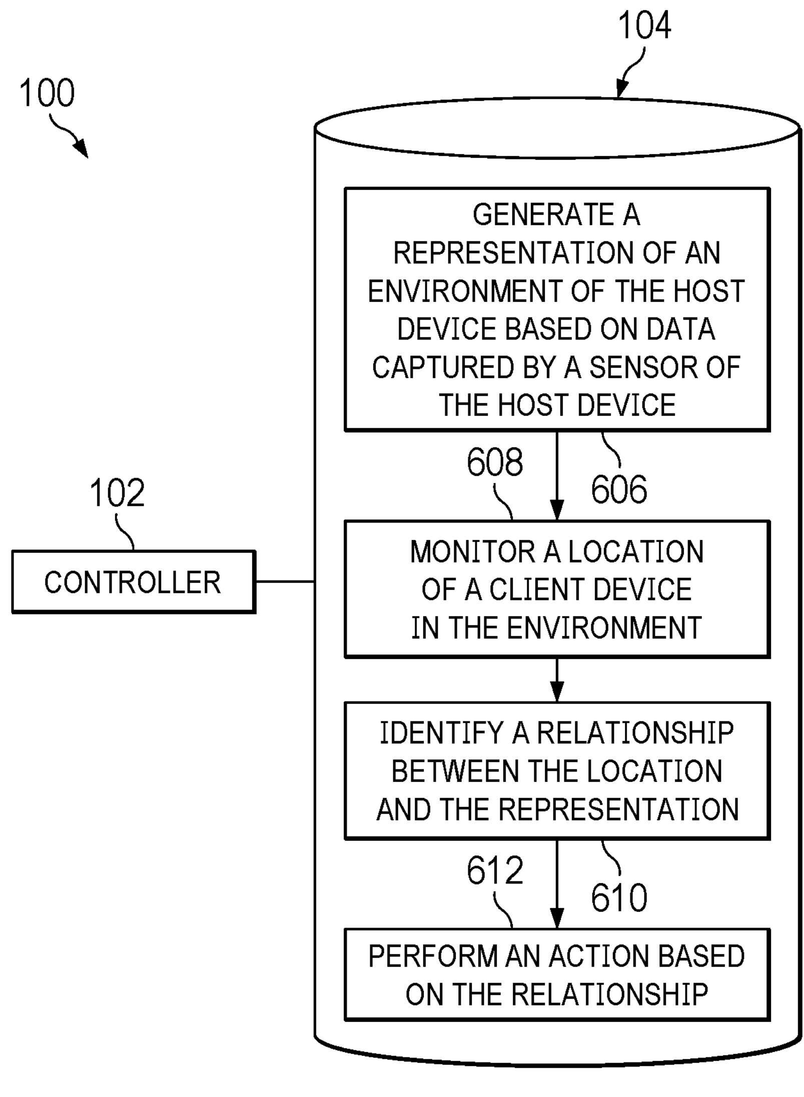
FIG. 6 is a block diagram of a non-transitory, computer-readable medium in accordance with various examples.

FIG. 6 is a block diagram of a non-transitory, computer-readable medium in accordance with various examples. More specifically, FIG. 6 is a block diagram of the host device 100 containing the controller 102 and the storage 104. The storage 104 may store executable instructions 606, 608, 610, and 612, which, when executed by the controller 102, cause the controller 102 to perform the actions described in executable instructions 606, 608, 610, and 612. For example, the controller 102 may generate a representation (e.g., a three- or four-dimensional floorplan) of an environment of the host device 100 based on data captured by a sensor 106 (e.g., a LiDAR camera module) of the host device 100 (606). The controller 102 may monitor a location of the client device 200 in the environment (608). The controller 102 may identify a relationship between the location of the client device 200 and the floorplan, such as a location of the client device 200 in the floorplan (610). The controller 102 may perform a predetermined action (e.g., a security action, such as logging out of an account) based on the relationship (612). For example, if the client device 200 is in the kitchen 318, the controller 102 may log out a user from an account on the host device 100.

The above description is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. An electronic device, comprising:
- a camera to capture data representing an environment external to the electronic device;
- a sensor to determine a location of a second electronic device in the environment; and
- a controller coupled to the camera and the sensor, the controller to:
  - generate a representation of the environment based on the captured data, the representation being a four-dimensional floorplan of the environment including multiple three-dimensional floorplans indexed by time;
  - determine a positional relationship between the second electronic device and the representation based on the captured data;
  - select a scenario from among a plurality of scenarios based on the positional relationship, the plurality of scenarios respectively corresponding to a plurality of predetermined actions; and
  - perform an action of the plurality of predetermined actions corresponding to the selected scenario.

2. The electronic device of claim 1, wherein the camera is a light detection and ranging (LiDAR) camera.

3. The electronic device of claim 1, wherein the sensor is an ultra-wide band (UWB) sensor.

4. The electronic device of claim 1, wherein the action includes logging out of an account on the electronic device.

5. The electronic device of claim 1, wherein the action includes locking an account on the electronic device.

6. The electronic device of claim 1, wherein the action includes handing off a video conferencing call from the electronic device to the second electronic device.

7. The electronic device of claim 1, wherein the action includes enacting a power conservation mode.

8. A non-transitory, computer-readable medium storing executable code, which, when executed by a controller of an electronic device, cause the controller to:
- generate a representation of an environment of the electronic device based on data captured by a camera of the electronic device, the representation being a four-dimensional floorplan of the environment including multiple three-dimensional floorplans indexed by time;
- monitor a location of a second electronic device in the environment based on data captured by a sensor of the electronic device;
- identify a positional relationship between the second electronic device and the representation based on the captured data;
- select a scenario from among a plurality of scenarios based on the positional relationship, respective ones of the plurality of scenarios being associated with a predetermined action; and
- perform the predetermined action associated with the selected scenario.

9. The computer-readable medium of claim 8, wherein the action includes logging into an account of the electronic device responsive to a movement of the second electronic device toward the electronic device.

10. The computer-readable medium of claim 8, wherein the action includes performing a security action to protect the electronic device.

11. The computer-readable medium of claim 8, wherein the action includes enacting a power conservation mode.

12. The computer-readable medium of claim 8, wherein the representation is a three-dimensional floorplan of the environment.

13. An electronic device, comprising:
- a light detection and ranging (LiDAR) camera to capture indications of an environment external to the electronic device;
- an ultra-wide band (UWB) sensor to determine a location of a second electronic device in the environment;
- an embedded controller to use a trained machine learning model to identify a structure in the environment based on the captured indications; and
- a controller coupled to the LiDAR camera, the UWB sensor, and the embedded controller, the controller to provide a representation of the environment based on the captured indications and the identified structures, the representation being a four-dimensional floorplan of the environment including multiple three-dimensional floorplans indexed by time, the controller to determine a positional relationship between the second electronic device and the representation based on the indications of the environment captured by the LiDAR camera, to select a scenario from among a plurality of scenarios based on the positional relationship, and to perform a predetermined action associated with the selected scenario.

14. The electronic device of claim 13, wherein the action includes logging into an account of the electronic device responsive to a movement of the second electronic device toward the electronic device.

15. The electronic device of claim 13, wherein the action includes performing a security action to protect the electronic device.

16. The electronic device of claim 13, wherein the action includes enacting a power conservation mode.

17. The electronic device of claim 13, wherein the controller is to:
- receive an input from a user of the electronic device; and
- modify the identification of the structure in the environment by the trained machine learning model, based on the input from the user.

18. The electronic device of claim 1, wherein:
- the sensor is to repeatedly determine the location of the second electronic device in the environment; and
- the controller is to determine a change in a distance between the electronic device and the second electronic device based on changes in the location between determinations.

19. The electronic device of claim 18, wherein the controller is to perform the action in response to a determination that the distance between the electronic device and the second electronic device is less than a predetermined distance.

* * * * *